United States Patent

Mori et al.

(10) Patent No.: US 7,029,760 B2
(45) Date of Patent: Apr. 18, 2006

(54) PLATED MATERIAL AND METHOD OF MANUFACTURING THE SAME, TERMINAL MEMBER FOR CONNECTOR, AND CONNECTOR

(75) Inventors: Akihito Mori, Aizuwakamatsu (JP); Takeshi Suzuki, Aizuwakamatsu (JP); Tadao Sakakibara, Aizuwakamatsu (JP); Shuzo Umezu, Aizuwakamatsu (JP); Masahiko Ishida, Aizuwakamatsu (JP)

(73) Assignee: Mitsubishi Shindoh Co., Ltd., Tokyo (JP)

(*) Notice: Subject to any disclaimer, the term of this patent is extended or adjusted under 35 U.S.C. 154(b) by 286 days.

(21) Appl. No.: 10/617,125

(22) Filed: Jul. 10, 2003

(65) Prior Publication Data

US 2004/0229077 A1 Nov. 18, 2004

(30) Foreign Application Priority Data

May 14, 2003 (JP) .............................. 2003-136084

(51) Int. Cl.
*B32B 15/00* (2006.01)
*H01H 1/02* (2006.01)
*H01H 1/38* (2006.01)
*C25D 5/50* (2006.01)

(52) U.S. Cl. ............... 428/600; 428/647; 428/687; 428/929; 428/941; 439/866; 439/886; 439/887; 205/226; 427/383.7

(58) Field of Classification Search ............... 428/600, 428/610, 687, 929, 941, 939, 612, 614, 647; 439/866, 886, 887; 205/224–228, 206, 210, 205/215; 427/309, 328, 383.7
See application file for complete search history.

(56) References Cited

U.S. PATENT DOCUMENTS

| | | | | |
|---|---|---|---|---|
| 3,863,318 A | * | 2/1975 | Niimi et al. ............... 75/243 |
| 5,139,585 A | * | 8/1992 | Watanabe et al. ............ 148/421 |
| 5,917,269 A | * | 6/1999 | Maruyama et al. ..... 310/323.03 |
| 6,475,635 B1 | * | 11/2002 | Sakai et al. ................. 428/553 |
| 6,649,559 B1 | * | 11/2003 | Drost et al. ................. 502/182 |
| 6,805,972 B1 | * | 10/2004 | Erlebacher et al. .......... 428/613 |
| 2003/0186597 A1 | * | 10/2003 | Suzuki et al. ............... 439/886 |
| 2004/0045641 A1 | * | 3/2004 | Kawasaki et al. ........... 148/435 |

FOREIGN PATENT DOCUMENTS

| JP | 02-034203 | * | 2/1990 |
|---|---|---|---|
| JP | 02-163350 | * | 6/1990 |
| JP | 04-004904 | * | 1/1992 |
| JP | 04-094890 | * | 3/1992 |
| JP | 7-268511 | | 10/1995 |
| JP | 2002-008499 | * | 1/2002 |

* cited by examiner

Primary Examiner—John J. Zimmerman
(74) Attorney, Agent, or Firm—Harness, Dickey & Pierce, PLC

(57) ABSTRACT

A plated material reduces insertion and withdrawal forces when used in a connector. A terminal member for a connector and a connector therewith are also provided. The plated material comprises a substrate 3 made of Cu or a Cu alloy and a metal plating layer 6 formed on the surface of the substrate 3. A soft region 6A spreading in a network-shape and a hard region 6B surrounded by the network of the soft region 6A coexists in the metal plating layer 6. The soft region 6A has a Vickers hardness of 20 to 250, while the hard region 6B has a Vickers hardness of 60 to 700, which is at least 30 higher than that of the soft region 6A. An average size of the network of the soft region 6A is from 5 to 500 μm.

11 Claims, 9 Drawing Sheets

Hv 130

Hv 30

Hv 100
Hv 50

Hv 65

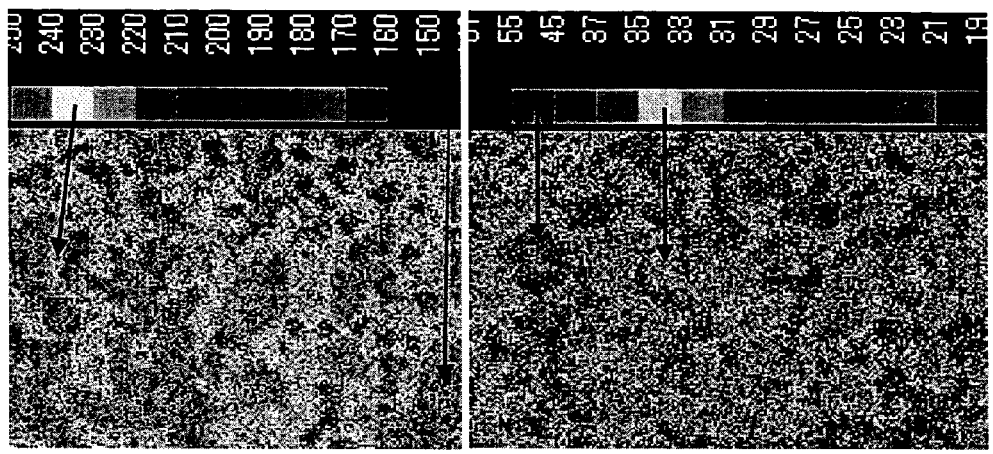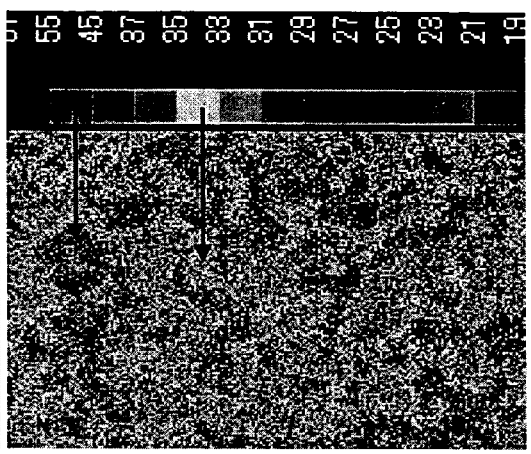
Fig. 15C  Fig. 15D
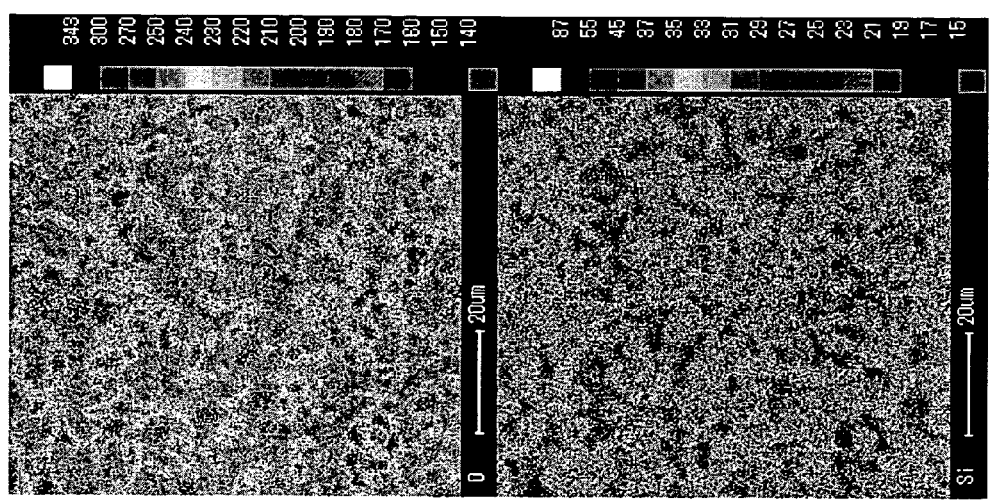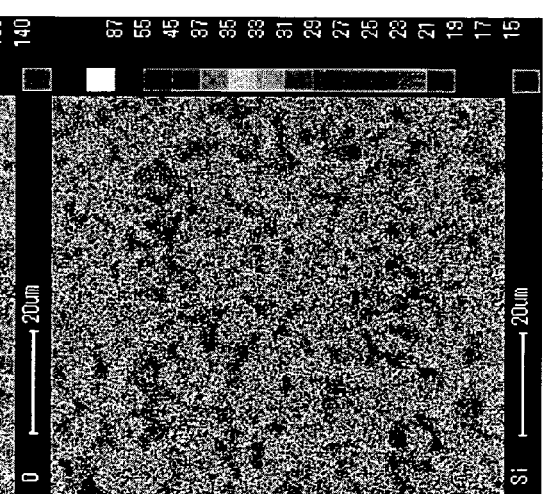
Fig. 15A  Fig. 15B

PLATED MATERIAL AND METHOD OF MANUFACTURING THE SAME, TERMINAL MEMBER FOR CONNECTOR, AND CONNECTOR

BACKGROUND OF THE INVENTION

1. Field of the Invention

The present invention relates to a plated material and to a method of manufacturing the same, to a terminal member for a connector, and to a connector.

2. Description of Related Art

Terminals of such as connectors for electrical wiring used in automobiles are manufactured by press working, blanking or bending of a copper alloy sheet. To enhance electrical connection characteristics of the resulting terminals, the copper alloy sheet is often subjected to Sn or Sn alloy plating. For example, Japanese Patent Application, First Publication No. Hei 7-268511 discloses an example of such terminals.

As multi-functionalization has recently progressed, electric and electronic circuits have become complicated and multipolarization of connectors used therein has advanced, and thus demands for multi-pin connectors have increased. For example, the automobile assembling process includes numerous processes for mounting connectors by workers. With the spread of multi-pin connectors, insertion force (and withdrawal force) of the connectors tend to increase and it becomes necessary to take worker fatigue into consideration. Therefore, multi-pin connectors having small insertion and withdrawal forces are required.

However, in a conventional terminal made of a Sn plated Cu alloy sheet, since both a male terminal and a female terminal have a relatively soft surface, sliding resistance between terminals was relatively large. Therefore, there was a limit to the reduction in the insertion and withdrawal forces.

In view of these circumstances, objects of the present invention are to provide a plated material capable of reducing insertion and withdrawal forces when used in a connector, and to provide a method for manufacturing the same, a terminal member for a connector, and a connector.

BRIEF SUMMARY OF THE INVENTION

The plated material of the present invention includes a substrate made of metal and a metal plating layer formed on the surface of the substrate. In the metal plating layer, a soft region spreading in a network-shape and a hard region surrounded by the network of the soft region coexists. The soft region has a Vickers hardness of 20 to 250, while the hard region a Vickers hardness of 60 to 700, which is at least 30 higher than that of the soft region. An average size of the network of the soft region is from 5 to 500 µm.

Since the plated material has a surface quality wherein the hard region coexists in the soft region spreading in a fine network-shape, and also each hardness is set within the above range, slidability can be enhanced by the soft region and excess wear of the surface of the metal plating layer can be prevented by the hard region. Since a contact pressure with an opposite material can be locally enhanced by making the surface hardness non-uniform, electric conduction can be certainly ensured and electrical resistance can be reduced.

The surface of the soft region may be located at the position which is 0.2 to 10 µm higher than that of the surface of the hard region in the thickness direction of the substrate.

In this case, the above-mentioned effect can be further enhanced because comparatively protruding soft region mainly contacts with the opposite material. The metal plating layer may be formed of Sn or a Sn alloy.

At least a portion (especially a sliding portion) of the terminal member for connector of the present invention is formed of the plated material. The connector of the present invention includes a terminal member, at least a portion of which is formed of the plated material.

The substrate may be formed of a copper alloy consisting essentially by mass percent of 0.3 to 2% Mg, 0.001 to 0.02% P, 0.0001 to 0.0013% C, 0.0002 to 0.002% O, and the balance of Cu and inevitable impurities.

The substrate may be formed of a copper alloy consisting essentially by mass percent of 0.5 to 3% Ni, 0.1 to 0.9% Sn, 0.08 to 0.8% Si, 0.1 to 3% Zn, 0.007 to 0.25% Fe, 0.001 to 0.2% P, 0.001 to 0.2% Mg, 0.0001 to 0.005% C, and the balance of Cu and inevitable impurities.

The method of manufacturing a plated material includes the steps of making the deposition condition of plating material on the surface of the metal substrate non-uniform; subjecting the surface of the substrate to metal plating to form a metal plating layer; and subjecting the substrate, on which the metal plating layer was formed, to a reflow treatment by heating to a temperature higher than a melting point of the metal plating; wherein the reflow treatment enables a soft region spreading in a network-shape and a hard region surrounded by the network of the soft region to coexist in the metal plating layer, while controlling so that the soft region has a Vickers hardness of 20 to 250, the hard region has a Vickers hardness of 60 to 700, which is at least 30 higher than that of the soft region, and an average size of the network of the soft region is from 5 to 500 µm. According to this method, the plated material can be manufactured at low cost.

In the step of making the deposition condition of plating material non-uniform, various treatments can be practiced. For example, an alloying element may be segregated at the grain boundary of the substrate in the step of making the deposition condition non-uniform, or an oxide may be formed at the grain boundary of the substrate. Also the thickness of the metal plating layer after the reflow treatment can be made to be non-uniform by previously providing the surface of the substrate with unevenness.

BRIEF DESCRIPTION OF THE SEVERAL VIEWS OF THE DRAWINGS

FIGS. 15A to 15D are diagrams showing EPMA analytical results of the surface of a substrate made of a copper alloy A after subjecting the substrate to a grain boundary oxide formation treatment at 300° C. for 3 hours.

DETAILED DESCRIPTION OF THE INVENTION

The embodiments of the plated material and the method of manufacturing the same, the terminal member for a connector, and the connector of the present invention will be described with reference to the accompanying drawings. The plated material of the present invention is not limited to use with connectors and is suitable for various uses as long as it is used for the purpose of reducing sliding resistance.

Figure 1:
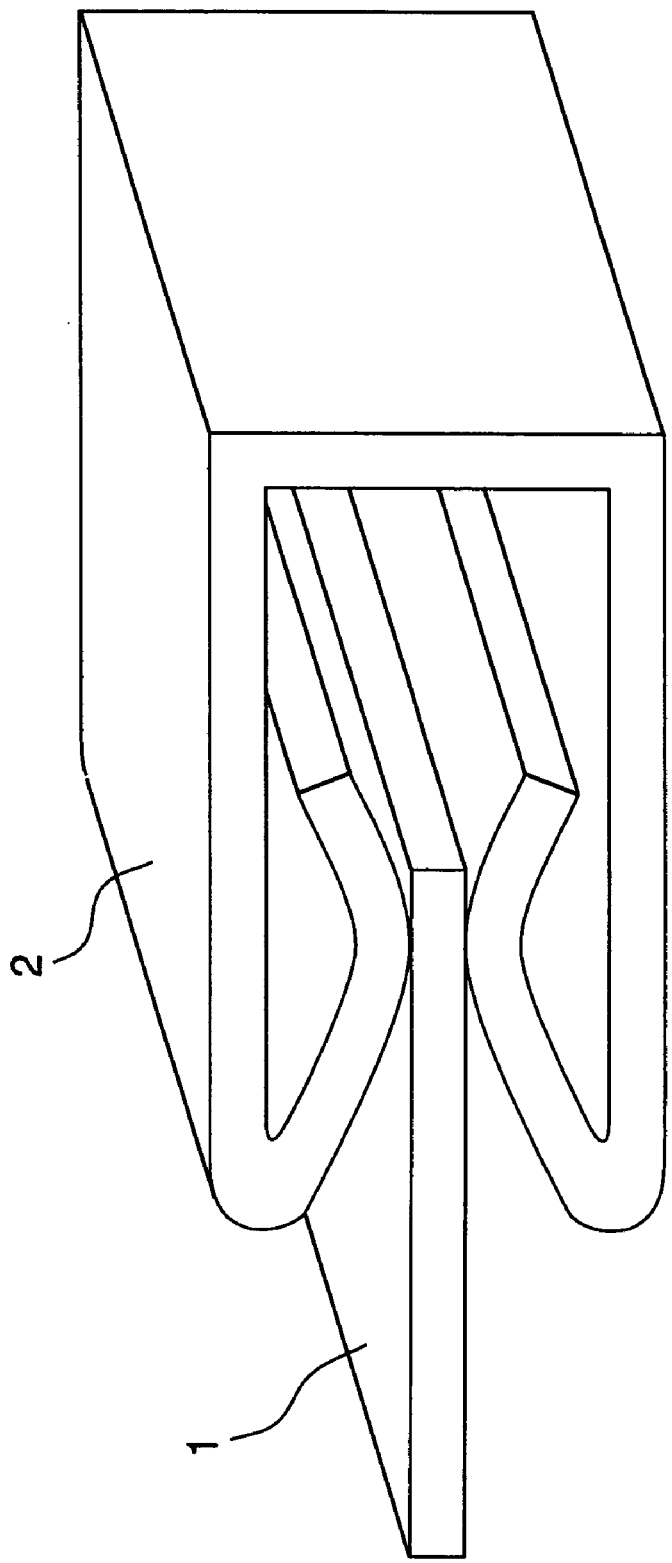
FIG. 1 is a perspective view showing a male terminal and a female terminal of a connector according to an embodiment of a terminal member for a connector of the present invention.

FIG. 1 shows a principal portion of a connector according to an embodiment of the present invention. This connector is mounted as an on-vehicle connector in automobiles, but is not limited to use for vehicle and is suitable for various uses. As shown in FIG. 1, this connector is composed of a male terminal 1 and a female terminal 2, which are mutually fittable, and at least one of them is formed of the plated material of the present invention. For example, in the case in which the terminal 2 is formed of the plated material of the present invention, the male terminal 1 may be formed of a plated material which includes neither soft regions nor hard regions and has an even surface, as described hereinafter. The entire male terminal 1 and/or the entire female terminal 2 may not be formed of the plated material, and only a portion including the sliding portion may be formed of the plated material.

Figure 2:
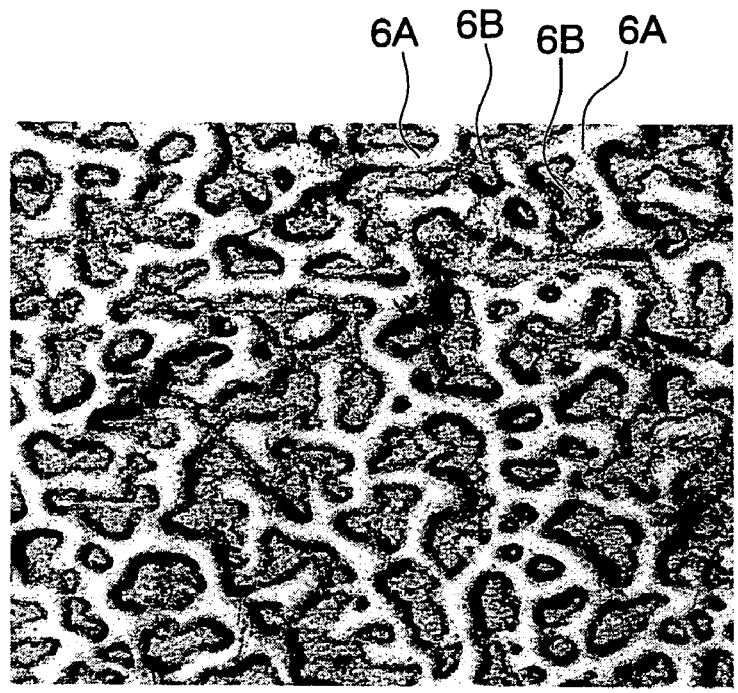
FIG. 2 is a micrograph showing a surface of an embodiment of a plated material of the present invention.
Figure 3:
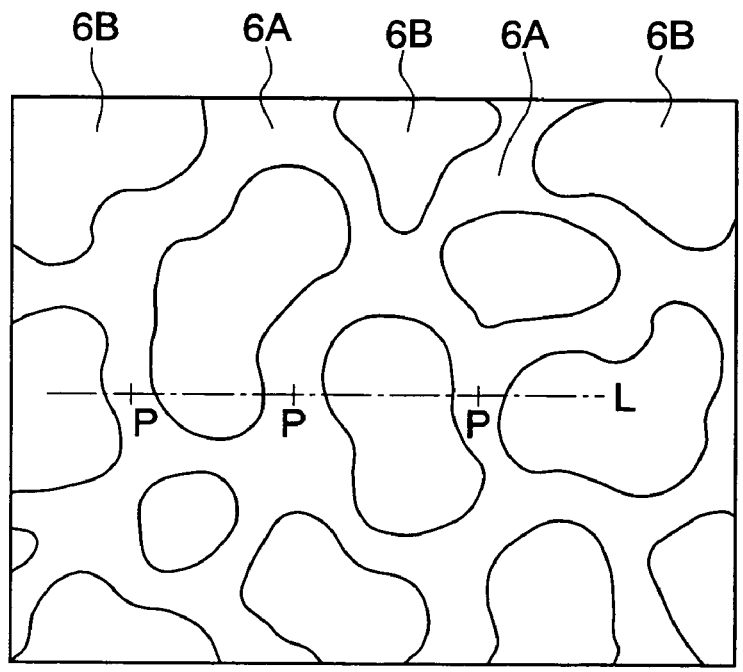
FIG. 3 is an enlarged view showing a surface of the plated material.
Figure 4:
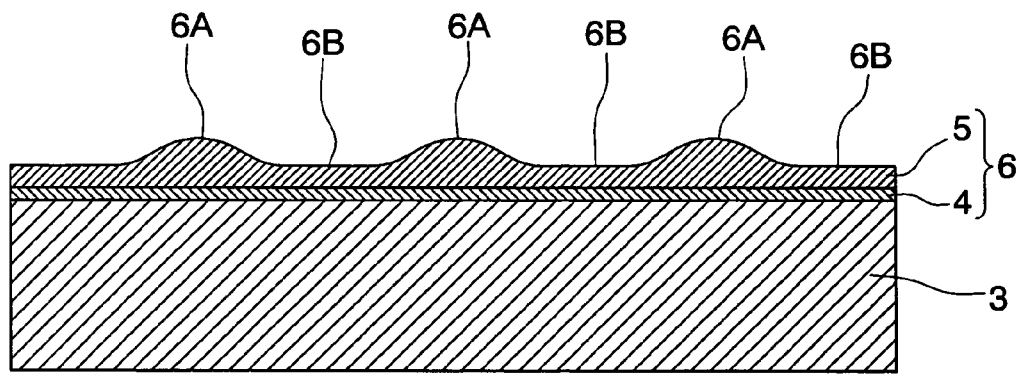
FIG. 4 is an enlarged view showing a cross section of the plated material.

FIG. 2 is a micrograph showing the surface according to an embodiment of a plated material of the present invention, FIG. 3 is an enlarged view of the plated material, and FIG. 4 is a cross-sectional enlarged view thereof. This plated material comprises a metal substrate 3 and a metal plating layer 6 formed on the entire surface of the substrate 3. The metal plating layer 6 comprises a lower layer (diffusion layer) 4 which is in contact with the substrate 3, and an upper layer 5 formed on the lower layer 4. The boundary between the lower layer 4 and the upper layer 5 may be clearly formed, or the composition may vary from the lower layer 4 to the upper layer 5 with a continuous concentration gradient. Before forming metal plating 6 (pure metal or an alloy), single or two-layer base plating may be performed using other metals. For example, a combination of Cu base plating+Sn plating, Ni base plating+Cu base plating+Sn plating can be mentioned. In this case, the thickness of the base plating is preferably from about 0 to 0.3 μm in the case of Cu base plating, and the thickness is preferably from about 0 to 0.2 μm in the case of Ni base plating, because slight influence of element segregation and oxidization on the boundary must remain.

In the metal plating layer 6, a soft region spreading in a network-shape 6A and a hard region 6B surrounded by the network of the soft region 6A coexist. The Vickers hardness of the soft region 6A is preferably from 20 to 250, and more preferably from 30 to 150. The Vickers hardness of the hard region 6B is from 60 to 700 and is at least 30 higher than that of the soft region 6A. In the case in which the Vickers hardness is within the above range, the slidability between the male terminal 1 and the female terminal 2 can be enhanced, and also the contact resistance can be reduced. The Vickers hardness of the hard region 6B is more preferably from 90 to 300. The Vickers hardness of the hard region 6B is preferably at least 60, and more preferably at least 100 higher than that of the soft region 6A. As used herein, the Vickers hardness Hv refers to a value as measured under a load of $98.07 \times 10^{-3}$N (10 g).

An average size of the network of the soft region 6A is from 5 to 500 μm. When the average size is smaller than 5 μm, the effect of enhancing the slidability and reducing the insertion and withdrawal force is hardly obtained. On the other hand, when the average size is larger than 500 μm, the contact state between the male terminal 1 and the female terminal 2 becomes unstable when used in a small-sized terminal, and thus the effect of reducing the insertion and withdrawal force varies. The size of unit cells of the network of the soft region 6A is more preferably from 20 to 300 μm. The size of the unit cells of the network can be calculated by the method of drawing a straight line L with a constant length (for example, an actual length of 0.2 mm on a metal plating layer 6) in the micrograph, as shown in FIG. 3, recording the number of networks in the soft region 6A, which intersect with this straight line (the number of the point P in the FIG. 3), and dividing the length of the straight line L by the number of points P. In the case in which the network is unclear, the size of the network can be calculated by measuring a profile of the plated surface using a laser microscope.

In this embodiment, as shown in FIG. 4, the height of the surface of the soft region 6A from the substrate 3 is 0.2 to 10 μm higher than that of the surface of the hard region 6B. The height of the soft region 6A is represented by an average value of a peak, while the height of the hard region 6B is represented by an average value of the height of the center. In this case, since relatively protruding soft region 6A mainly contacts with an opposite material, the above effect can be further enhanced. When a difference in height is at least 0.2 μm, the above effect is excellent. When the difference in height exceeds 10 μm, the contact resistance and sliding resistance may become unstable.

The material of the substrate 3 is not necessarily limited and, for example, Cu, Cu alloy, 42 alloy, aluminum and aluminum alloy can be used. Among these materials, Cu or Cu alloy having high conductivity is particularly preferable. As the Cu alloy, for example, Cu—Zn alloy, Cu—Ni—Si alloy, Cu—Mg—P alloy, Cu—Fe—P alloy and Cu—Sn—P alloy are preferable. The material (before subjecting to a reflow treatment) of the metal plating layer 6 is preferably one, two or more kinds of metals selected from among Sn, Cu, Ag, Ni, Pb, Zn, Cr, Mn, Fe, Co, Pd, Pt, Ti, Zr, Hf, V, Nb, Ta, Mo, W, In, Au, Al, Si, Sb, Bi and Te. In view of the cost and corrosion resistance, Sn is particularly preferable.

The substrate 3 may be formed of the following copper alloys:
(1) copper alloy consisting essentially by mass percent of 0.3 to 2% Mg, 0.001 to 0.02% P, 0.0001 to 0.0013% C, 0.0002 to 0.002% O, and the balance of Cu and inevitable impurities; and (2) copper alloy consisting essentially by mass percent of 0.5 to 3% Ni, 0.1 to 0.9% Sn, 0.08 to 0.8% Si, 0.1 to 3% Zn, 0.007 to 0.25% Fe, 0.001 to 0.2% P, 0.001 to 0.2% Mg 0.0001 to 0.005% C, and the balance of Cu and inevitable impurities.

Both of the above alloys (1) and (2) are particularly useful as a connector, which requires heat resistance, used in an automobile engine chamber because of excellent spring characteristics and excellent heat-resistant creep properties, because long-term thermal stability at high temperature is required for a Sn plating material as the operating environment of the connector has recently become more severe.

In the case in which the connector is formed of two kinds of copper alloys described above, a Cu base-reflow Sn plating treatment has hitherto been performed. In this case, a Cu base plating having a thickness of at least 0.5 micrometer was often performed in order to obtain a smooth Sn plating surface. However, when the Sn plating material is heated at high temperature of about 180° C. for a long time, peeling was liable to occur at the plating interface. It is considered that heat peeling is caused by easily oxidizable elements Mg and Si, which are respectively contained in the alloy (1) and the alloy (2), and a difference in diffusion rate during heating at high temperature for a long time between a matrix, Cu base and Sn plating. In a case in which two kinds of copper alloys described above are subjected to a Sn plating treatment of the present invention, there is a merit in that the insertion and withdrawal forces can be reduced and heat-resistant reliability to heating at high temperature for a long time can be improved.

The plating thickness (upper layer 5+lower layer 4) of the soft region 6A is not specifically limited, but is preferably from 0.3 to 12 µm. When the plating thickness of the soft region 6A is smaller than 0.3 µm, it becomes impossible to ensure sufficient softness. On the other hand, when the plating thickness is larger than 12 µm, the press workability of the terminal member deteriorates and the insertion and withdrawal forces increase. The plating thickness of the soft region 6A is more preferably from 0.5 to 10 µm.

The plating thickness (upper layer 5+lower layer 4) of the hard region 6B is not limited, but is preferably from about 0.1 to 2 µm. When the plating thickness is smaller than 0.1 µm, it becomes impossible to obtain the effect of improving the corrosion resistance due to the metal plating layer 6 and the substrate 3 may be exposed by wear of the metal plating layer 6. When the plating thickness of the hard region 6B is larger than 2 µm, it becomes difficult to ensure a difference in hardness between the hard region 6B and the soft region 6A. The plating thickness of the hard region 6B is more preferably from 0.1 to 1 µm.

The thickness of the lower layer 4 as the alloy layer formed by diffusion is preferably from about 0.1 to 2 µm. When the thickness is within the above range, it is possible to obtain a proper effect of protecting the substrate 3 due to the metal plating layer 6. The thickness of the lower layer 4 preferably accounts for about 10 to 100% of the thickness of the hard region 6B. When the thickness is within the above range, it is possible to obtain the effect of enhancing insertion and withdrawal stability because of less variation of the hardness of the hard region 6B. More preferably, the thickness of the lower layer 4 accounts for 30 to 80% of the thickness of the hard region 6B.

Although the composition of the lower layer 4 varies depending upon the materials of the substrate 3 and the metal plating layer 6, the lower layer 4 is formed of a Cu—Sn-based alloy in the case in which the substrate 3 is made of copper or a copper alloy and the metal plating layer before subjecting to a reflow treatment is made of tin or a tin alloy. With respect to an elemental ratio of the Cu—Sn-based alloy, a mass ratio Cu:Sn is, for example, from 25:75 to 65:35.

According to the above embodiment, since the plated material used as the male terminal 1 and/or the female terminal 2 has a surface quality wherein the hard region 6B coexists in the soft region 6A spreading in a fine network-shape, and also each hardness is set within the above range, the soft region 6A, which relatively forms the protruding portion, contacts with an opposite material and slides. Therefore, the insertion and withdrawal forces of the connector can be reduced because of small sliding resistance.

As compared with the case where the entire contact surface between the male terminal 1 and the female terminal 2 is smooth, the contact area between both terminals decreases in the present embodiment and, furthermore, the presence of the soft region 6A reduces the frictional resistance per unit contact area. Therefore, the insertion and withdrawal forces can be reduced by the synergistic effect of the two. Furthermore, since the contact pressure with the opposite material can be locally enhanced by non-uniform surface hardness, the electrical resistance can be suppressed by certainly ensuring electric conduction as compared with the case where the entire surface of the terminal is hard.

It is only the soft region 6A, as the protruding portion, that is worn away by sliding between the male terminal 1 and the female terminal 2. Even if the soft region 6A was worn away, the hard region 6B remains without being worn away. Therefore, in respect to the corrosion resistance and strength required to the metal plating layer 6, the product of the present invention withstands comparison with a conventional product.

In the case in which the surface of the soft region 6A is located at the position which is 0.2 to 10 µm higher than that of the surface of the hard region 6B, since the protruding soft region 6A mainly contacts with the opposite material, the above effect can be further enhanced.

For example, it is preferable to make a female terminal 2 of the plated material and to make a male terminal of a plating material having an intermediate hardness between the hardness of the hard region 6B and that of the soft region 6A of the female terminal 2. In this case, the insertion and withdrawal force is reduced by wear of the soft region 6A and the hard region 6B prevents initiation of wear of the substrate 3. The soft region 6A is also useful to ensure the solderability.

In this embodiment, the male terminal 1 may be formed of the plated material described above and, more preferably, a metal plating layer including neither the soft region 6A nor the hard region 6B is formed on the metal substrate.

In this case, the metal substrate of the male terminal 1 and the substrate 3 may be the same. The metal plating layer may be formed by plating with two or more kinds of metals selected from among Sn, Cu, Ag, Ni, Pb, Zn, Cr, Mn, Fe, Co, Pd, Pt, Ti, Zr, Hf, V, Nb, Ta, Mo, W, In, Au, Al, Si, Sb, Bi and Te. Alternatively, after plating, metal plating is melted by a reflow treatment of the substrate, thereby to cause diffusion between the plating metal and the substrate, thus forming an alloy layer as the lower layer. The plating metal is particularly preferably Sn or a Sn alloy in view of the cost and corrosion resistance.

In the case of the male terminal 1, a Sn layer having a thickness of 0.2 to 10 µm is formed on a substrate made of Cu or a Cu by various plating methods, and then Sn in the Sn layer and Cu in the substrate are diffused by a heat treatment to form a Cu—Sn alloy layer, while the thickness of a pure Sn layer is preferably controlled within a range from 0 to 8 μm. More preferably, the thickness of the pure Sn layer in the male terminal 1 is controlled to be less than 0.3 μm. Still more preferably, the surface may be hardened by performing a heat treatment until the thickness of the pure Sn layer in the male terminal 1 is controlled to be 0, thereby forming a Cu—Sn alloy layer on the surface.

The method of manufacturing the above embodiment will now be described.

This method comprises the steps of making the deposition condition of plating material on the surface of a metal substrate 3 non-uniform; subjecting the surface of the substrate to metal plating to form a metal plating layer; and subjecting the substrate, on which the metal plating layer was formed, to a reflow treatment by heating to the temperature higher than a melting point of the metal plating.

In the step of making the deposition condition non-uniform, for example, the surface of the substrate 3 is subjected to a treatment for making the wettability to the molten metal non-uniform. Consequently, in the case of melting a metal plating layer 6 by a reflow treatment, the thickness of the metal plating layer 6 varies in a fixed pattern. Although the treating method used in this step is not limited, it is possible to use (1) a method of segregating an alloying element at the grain boundary of the substrate 3, or (2) a method of forming a trace amount of an oxide at the grain boundary of the substrate 3.

(1) To segregate the alloying element at the grain boundary of the substrate 3, for example, it is possible to use a method of positively allowing one, or two or more kinds selected from among Si, Fe, Mg, Ti, Ca, Zr and Al to exist at the grain boundary by subjecting to a heat treatment in a weak reducing atmosphere before the step of subjecting to metal plating or during the step of manufacturing the substrate 3.

(2) To form the oxide at the grain boundary of the substrate 3, it is possible to use a method of positively forming an oxide containing one, or two or more kinds selected from among Mg, Al, Si, Ca, Be, Cr, Ti, P, Zr and Fe on the surface of a Cu alloy substrate 3 containing the above elements by subjecting to a heat treatment in a weak oxidizing atmosphere before the step of subjecting to metal plating or during the step of manufacturing the substrate 3.

In this case, in the reflow treatment process, when the metal plating layer is once melted, a local protuberance is formed in a network-pattern in a melt by the interaction between a surface tension of the melt and the wettability of the surface of the substrate 3. This enables a soft region 6A spreading in a network-shape and a hard region 6B surrounded by the network of the soft region 6A to coexist. At the same time, the following conditions can be ensured: the soft region 6A has a Vickers hardness of 20 to 250, the hard region 6B has a Vickers hardness of 60 to 700, which is at least 30 higher than that of the soft region 6A, and an average size of the network of the soft region 6A is from 5 to 500 μm. Optimum manufacturing conditions are decided by some tests.

The reflow treatment conditions, which meet the above conditions, are not limited because they vary depending upon the material of the metal plating layer 6. In the case in which the substrate 3 is made of copper or a copper alloy and the metal plating layer before subjecting to the reflow treatment is made of Sn or a Sn alloy, the temperature is preferably from 232 to 1000° C. When the temperature is within the above range, the soft region 6A and the hard region 6B can be easily formed. More preferably, the temperature is from 300 to 800° C. The reflow treatment time is not limited, but is preferably from about 0.05 to 5 minutes to perform proper diffusion. A lower layer 4 as the alloy layer is formed by diffusion of a matrix element from the substrate 3 and a ratio of the thickness of an upper layer 5, as the soft layer, to the entire thickness decreases in the hard region 6B. Therefore, the hardness of the hard region 6B relatively increases.

After subjecting to the reflow treatment, diffusion may be promoted by an additional heat treatment at a temperature lower than a melting temperature of the metal plating layer 6, thereby increasing the thickness of the lower layer 4.

In the manufacturing method described above, unevenness in thickness of the metal plating layer 6 was caused by the reflow treatment, thereby forming a soft region 6A and a hard region 6B. However, the method of forming the soft region 6A and the hard region 6B is not limited thereto.

Figure 5:
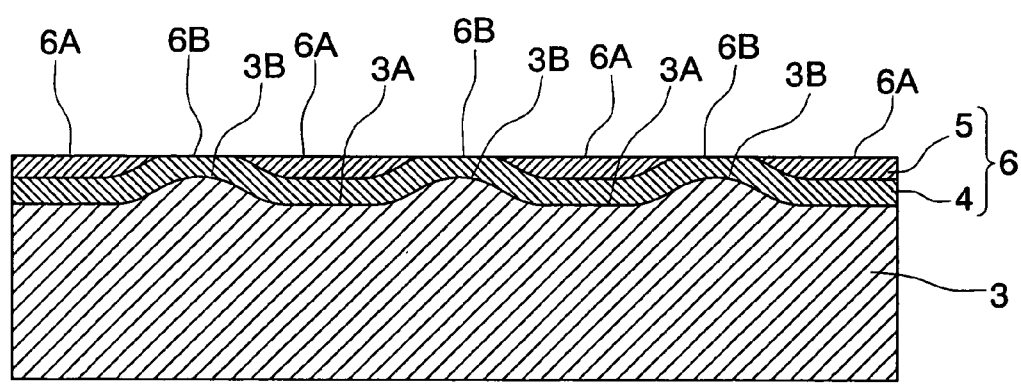
FIG. 5 is an enlarged cross-sectional view showing another embodiment of a plated material of the present invention.

For example, it is also possible to use a method of further providing the step of etching or mechanical-polishing the surface of a substrate 3, previously forming a fine recess portion 3A and a fine protruding portion 3B on the surface of the substrate 3 (this step corresponds to the step of making the deposition condition non-uniform), forming a metal plating layer so as to reduce the unevenness and optionally subjecting to a reflow treatment, as shown in FIG. 5. According to this method, at the position where the thickness of the metal plating layer on the protruding portion 3B is small, a matrix element diffusing from the substrate 3 reaches the surface or the vicinity of the surface and, therefore, a hard region 6B having a relatively high Vickers hardness is formed. At the position where the thickness of the metal plating layer on the protruding portion 3A is large, a matrix element diffusing from the substrate 3 merely diffuses to the deep position from the surface and, therefore, a soft region 6A having a relatively low Vickers hardness is formed. The conditions of the soft region 6A and the hard region 6B are as described above.

Etching or cutting of the metal plating layer after subjecting to the reflow treatment makes it possible to obtain a plating material which comprises a metal plating layer having unevenness on the surface, and also includes a soft region 6A and a hard region 6B. For example, a metal plating layer having a uniform thickness is formed on a substrate and a conventional reflow treatment is performed, thereby to form an alloy layer having a uniform thickness as the lower layer portion of the metal plating layer and, furthermore, the metal plating layer is provided with unevenness by etching or cutting. Consequently, at the recess portion, a hard alloy layer is exposed or the thickness of the soft upper layer is reduced to form a hard region 6B. At the protruding portion, a thick soft upper layer remains to form a soft region 6A. It is possible to efficiently provide fine unevenness by roll working.

As described above, according to the method of manufacturing a plated material of the respective embodiments described above, the plated material of the present invention can be manufactured at low cost.

EXAMPLES

The following Examples further illustrate the present invention in detail.

[Test 1]

Under the conditions shown in Table 1, female terminals having the shape shown in FIG. 1 of Example 1 to 7 and Comparative Examples 1 to 8 were manufactured. In Examples 1 to 7, a soft region and a hard region, which meet the conditions of the present invention, were formed. In Comparative Examples 1 and 4 to 6, an influence of the substrate surface was avoided to the utmost by subjecting to a thick Cu base plating as compared with the Examples. Comparative Example 2 shows an example with less difference in hardness between the soft region and the hard region (difference in plating thickness). Comparative Example 3 shows an example which employs hard Sn plating (a ratio of an alloy layer is increased). Comparative Examples 7 and 8 show examples which employ conventional reflow Sn plating (without subjecting to a grain boundary oxide formation treatment or a segregation treatment).

As the substrate, any of copper alloys A to E shown in Table 2 was used. The substrate made of each of these copper alloys was subjected to a grain boundary oxide formation treatment (or a segregation treatment) under the conditions shown in Table 1, thereby to segregate an alloying element at the grain boundary of the surface of the substrate and to form an oxide thereof. As an atmosphere for treatment, a weak oxidizing atmosphere prepared by adding 800 ppm of oxygen to a nitrogen gas was employed. A difference in Sn plating thickness was made by segregation of the oxide.

FIGS. 15A to 15D are diagrams showing EPMA analytical results of the surface of a substrate made of a copper alloy A after subjecting the substrate to a grain boundary oxide formation treatment at 300° C. for 3 hours. FIG. 15A shows a concentration distribution of oxygen atoms, while FIG. 15B shows a concentration distribution of silicon atoms. As is apparent from the fact that oxygen and silicon are detected at the same position, silicon oxide is formed along the grain boundary. FIGS. 15C and 15D are enlarged diagrams of FIGS. 15A and 15B, in which black arrows show a difference in concentration of the oxide.

TABLE 1

| | Plating characteristics | | | | | |
|---|---|---|---|---|---|---|
| | Sn plating thickness (μm) | | Base thickness | Pure Sn layer thickness (μm) | | Network length |
| Female terminal | Hard region | Soft region | (μm) | Hard region | Soft region | (μm) |
| Example 1 | 0.31 | 4.23 | Cu: 0 | 0.12 | 1.88 | 55 |
| Example 2 | 0.45 | 3.72 | Cu: 0.12 | 0.21 | 1.57 | 70 |
| Example 3 | 0.52 | 2.95 | Cu: 0.27 | 0.28 | 1.28 | 75 |
| Example 4 | 0.11 | 6.52 | Cu: 0.15 | 0.05 | 4.32 | 100 |
| Example 5 | 0.76 | 1.03 | Cu: 0.29 | 0.42 | 0.68 | 400 |
| Example 6 | 0.33 | 2.57 | Cu: 0.25 | 0.18 | 1.03 | 80 |
| Example 7 | 0.65 | 1.32 | Ni: 0.08 | 0.41 | 0.96 | 450 |
| Comparative Example 1 | 1.12 | | Cu: 0.42 | 0.62 | | — |
| Comparative Example 2 | 1.12 | 1.21 | Cu: 0.38 | 0.65 | 0.72 | 700 |
| Comparative Example 3 | 1.07 | | Cu: 0.45 | 0.08 | | — |
| Comparative Example 4 | 0.93 | | Cu: 0.44 | 0.58 | | — |
| Comparative Example 5 | 1.02 | | Cu: 0.51 | 0.61 | | — |
| Comparative Example 6 | 2.03 | | Cu: 0.48 | 0.88 | | — |
| Comparative Example 7 | 1.54 | | Cu: 0.25 | 0.73 | | — |
| Comparative Example 8 | 0.88 | | Cu: 0.46 | 0.45 | | — |
| Male terminal used in combination | 0.98 | | Cu: 0.54 | 0.52 | | — |

| | Plating characteristics | | | | | |
|---|---|---|---|---|---|---|
| | Reflow conditions | | Surface hardness Hv (10 gf) | | | |
| Female terminal | Temperature (° C.) | Time (sec) | Hard region | Soft region | Copper alloy | Grain boundary oxide formation or segregation treatment |
| Example 1 | 300 | 55 | 130 | 30 | A | 300° C. × 3 hr |
| Example 2 | 300 | 55 | 100 | 50 | A | 300° C. × 3 hr |
| Example 3 | 300 | 55 | 100 | 40 | A | 300° C. × 3 hr |
| Example 4 | 300 | 50 | 173 | 23 | C | 300° C. × 3 hr |
| Example 5 | 300 | 40 | 98 | 63 | B | 300° C. × 3 hr |
| Example 6 | 320 | 55 | 134 | 58 | D | 300° C. × 3 hr |
| Example 7 | 320 | 70 | 102 | 55 | E | 300° C. × 3 hr |
| Comparative Example 1 | 300 | 55 | 65 | | A | 300° C. × 3 hr |
| Comparative Example 2 | 300 | 55 | 73 | 63 | A | 300° C. × 3 hr |
| Comparative Example 3 | 350 | 600 | 243 | | A | 300° C. × 3 hr |
| Comparative Example 4 | 300 | 55 | 72 | | C | 300° C. × 3 hr |
| Comparative Example 5 | 300 | 55 | 63 | | D | 300° C. × 3 hr |
| Comparative Example 6 | 320 | 55 | 58 | | E | 300° C. × 3 hr |
| Comparative Example 7 | 300 | 55 | 56 | | A | none |
| Comparative Example 8 | 300 | 55 | 80 | | D | none |
| Male terminal used in combination | 280 | 65 | 70 | | I | none |

TABLE 2

| Copper alloy | Composition (balance of Cu) (% by mass) | Tensile strength (N/mm²) | Elongation (%) | Vickers hardness (HV) | Sheet thickness (mm) |
|---|---|---|---|---|---|
| A | Ni: 2.82, Si: 0.67, Sn: 0.48, Zn: 0.62, Fe: 0.008, P: 0.003, Mg: 0.003, C: 0.0007 | 736 | 13.8 | 226 | 0.25 |
| B | Zn: 10.2, Sn: 2.1 | 535 | 10.1 | 165 | |
| C | Mg: 0.68, P: 0.007, C: 0.0003, O: 0.0008 | 530 | 10.8 | 163 | |
| D | Ni: 1.93, Si: 0.46, Sn: 0.47, Zn: 0.83, Fe: 0.033, P: 0.012, Mg: 0.005, C: 0.0005 | 682 | 14.2 | 201 | |
| E | Ni: 2.33, Si: 0.53, Sn: 0.50, Zn: 0.73, Fe: 0.010, P: 0.005, Mg: 0.032, C: 0.0008 | 725 | 15.5 | 220 | |
| F | Ni: 2.88, Si: 0.70, Sn: 0.55, Zn: 0.52, Fe: 0.045, P: 0.032, Mg: 0.021, C: 0.0009 | 753 | 13.5 | 236 | 0.64 |
| G | Zn: 30.1 | 542 | 13.2 | 176 | |
| H | Fe: 2.24, P: 0.023, Zn: 0.12 | 531 | 8.9 | 153 | |
| I | Mg: 0.85, P: 0.015, C: 0.0002, O: 0.0006 | 585 | 8.0 | 178 | |
| J | Ni: 2.05, Si: 0.48, Sn: 0.52, Zn: 0.91, Fe: 0.008, P: 0.003, Mg: 0.012, C: 0.0006 | 575 | 7.5 | 170 | |

Then, a very thin Cu base layer having a thickness of 0 to 0.51 µm was formed on the substrate by electroplating and the thickness of the Cu base layer varied, thereby to make a difference in influence of the oxide on wettability to Sn upon reflow treatment. As the thickness of the Cu base layer increases, the influence of the oxide becomes smaller and the thickness between the soft region and the hard region decreases. A plating solution for formation of the Cu base layer, containing 200 g/l of copper sulfate and 55 g/l of sulfuric acid was used. A plating bath temperature was controlled to 30° C. and a current density was controlled to 2 A/dm².

On the Cu base layer, a Sn plating layer was then formed. A plating solution containing 40 g/l of stannous sulfate, 110 g/l of sulfuric acid, 25 g/l of cresolsulfonic acid and 7 g/l of additives was used. A plating bath temperature was controlled to 20° C. and a current density was controlled to 3 A/dm².

Each of these substrates was heated in a nitrogen atmosphere under the conditions described in Table 1, thereby to melt the Sn plating layer and to mutually diffuse Cu of the Cu base layer and the substrate surface, and Sn of the Sn plating layer, thus forming a Cu—Sn alloy layer at the interface between both layers.

Figure 6:
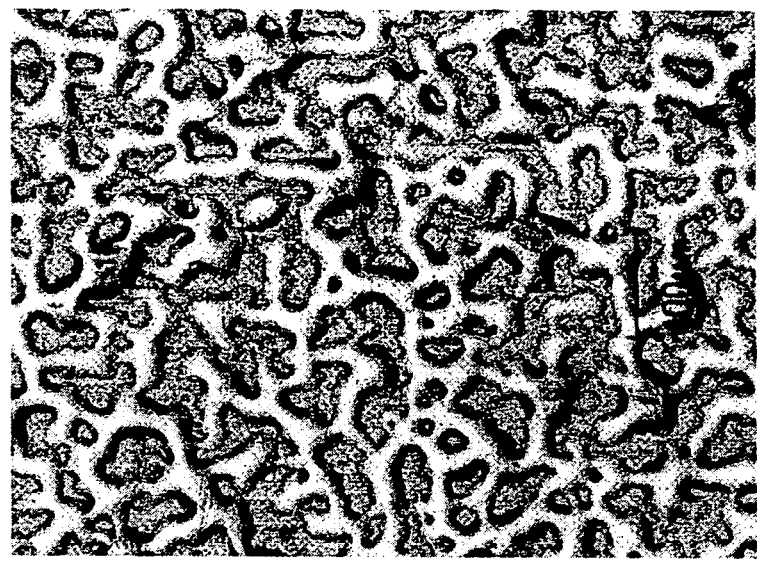
FIG. 6 is a micrograph showing a surface of a plated material according to Example 1 of the present invention.
Figure 7:
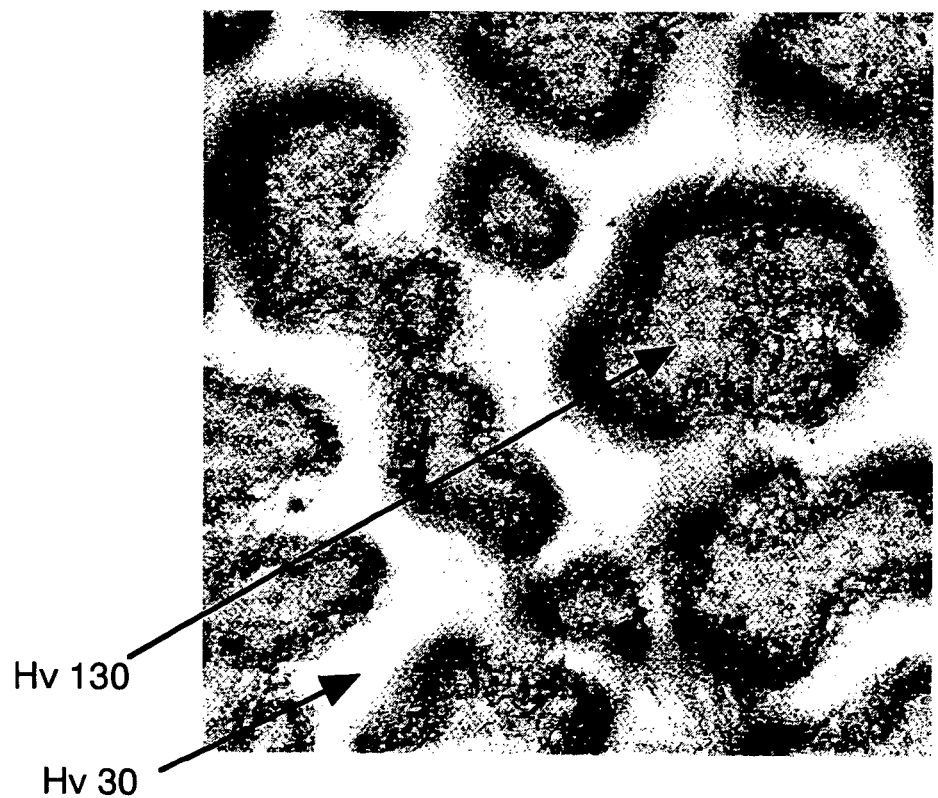
FIG. 7 is a micrograph showing a surface of a plated material according to Example 1 of the present invention.
Figure 8:
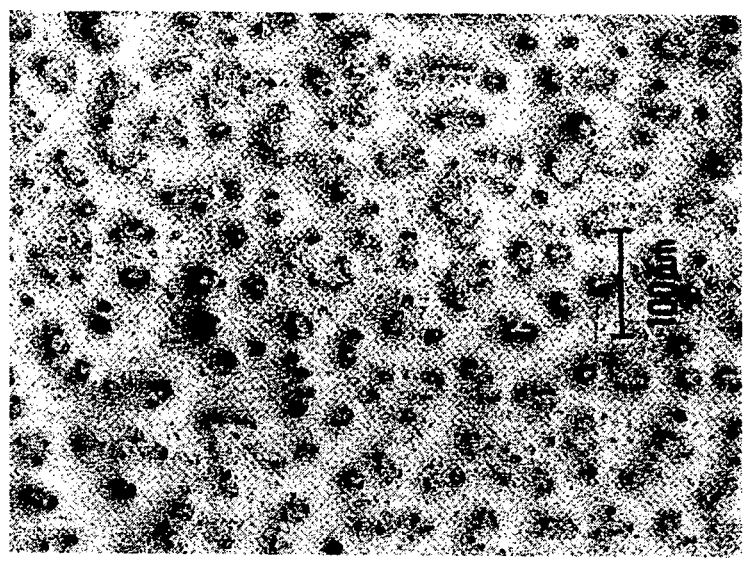
FIG. 8 is a micrograph showing a surface of a plated material according to Example 2 of the present invention.
Figure 9:
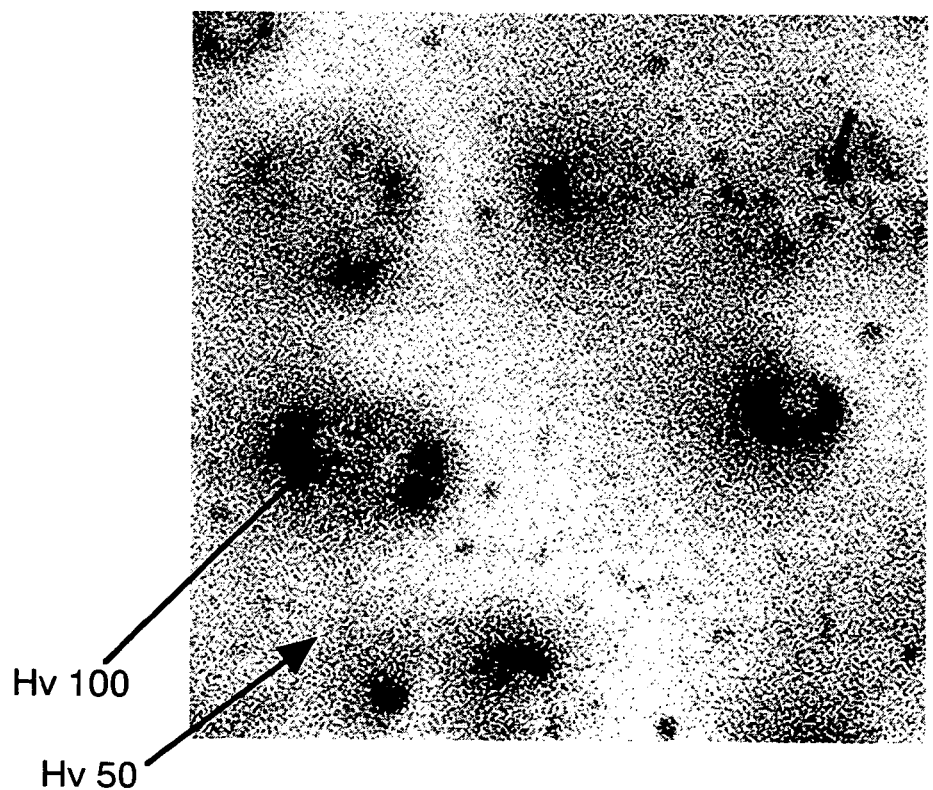
FIG. 9 is a micrograph showing a surface of a plated material according to Example 2 of the present invention.
Figure 10:
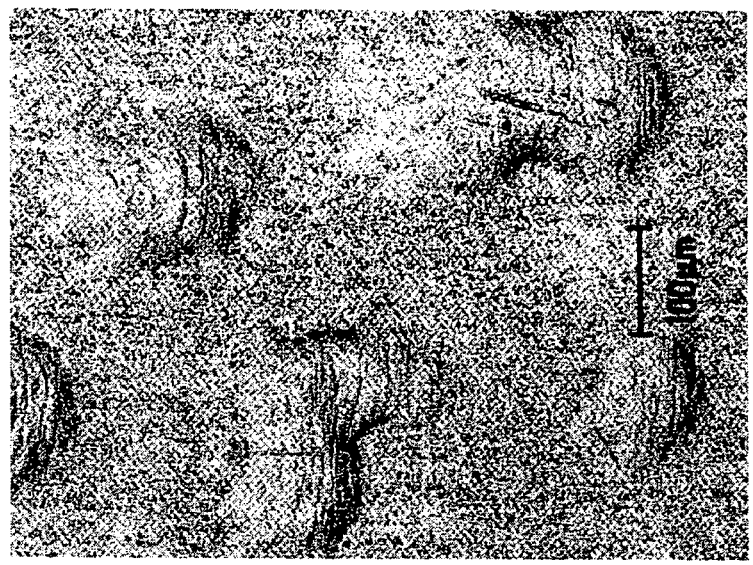
FIG. 10 is a micrograph showing a surface of a plated material according to Example 3 of the present invention.
Figure 11:
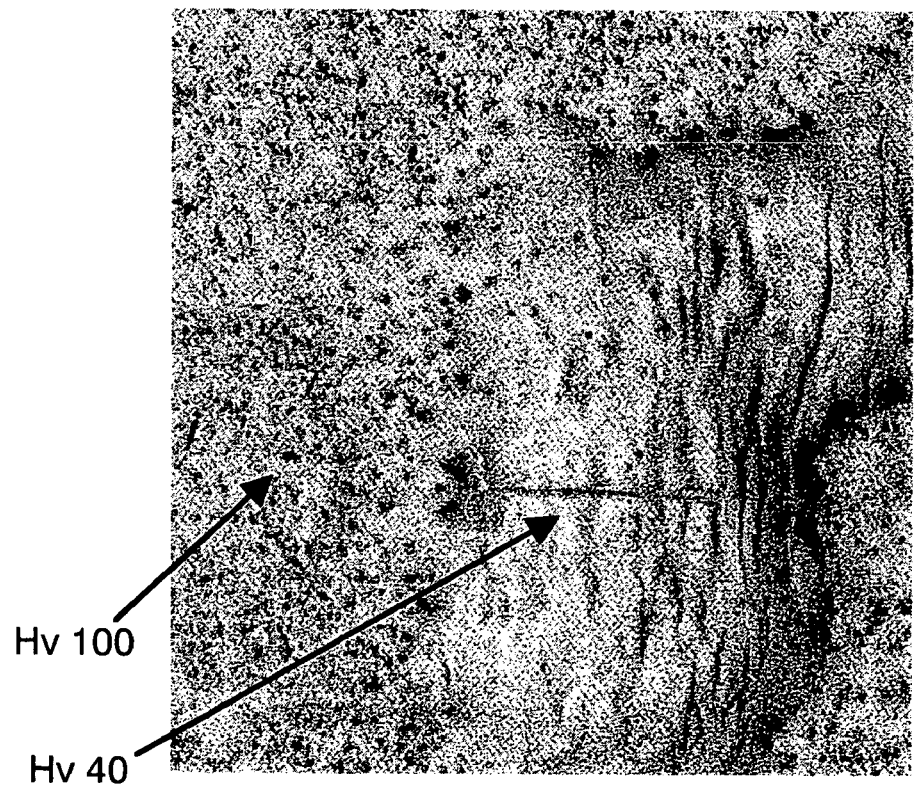
FIG. 11 is a micrograph showing a surface of a plated material according to Example 3 of the present invention.
Figure 12:
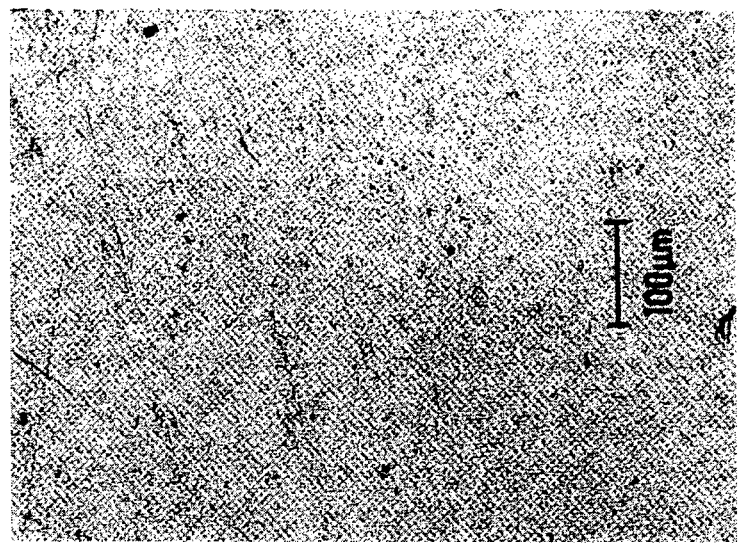
FIG. 12 is a micrograph showing a surface of a plated material according to Comparative Example 1 of the present invention.
Figure 13:
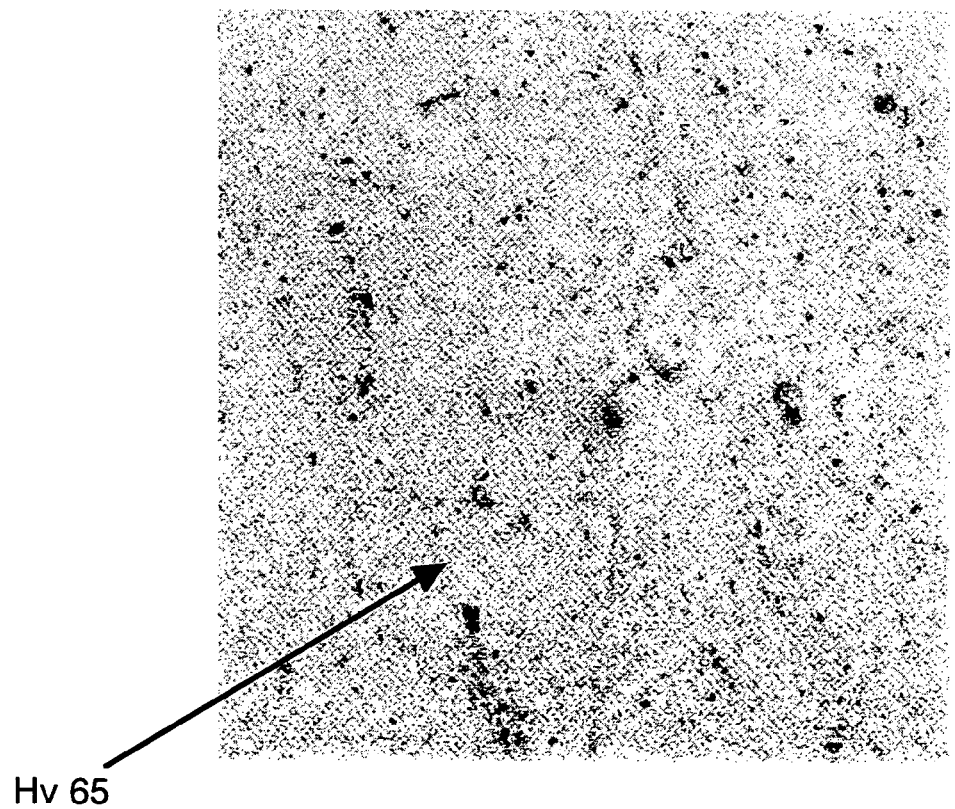
FIG. 13 is a micrograph showing a surface of a plated material according to Comparative Example 1.
Figure 14:
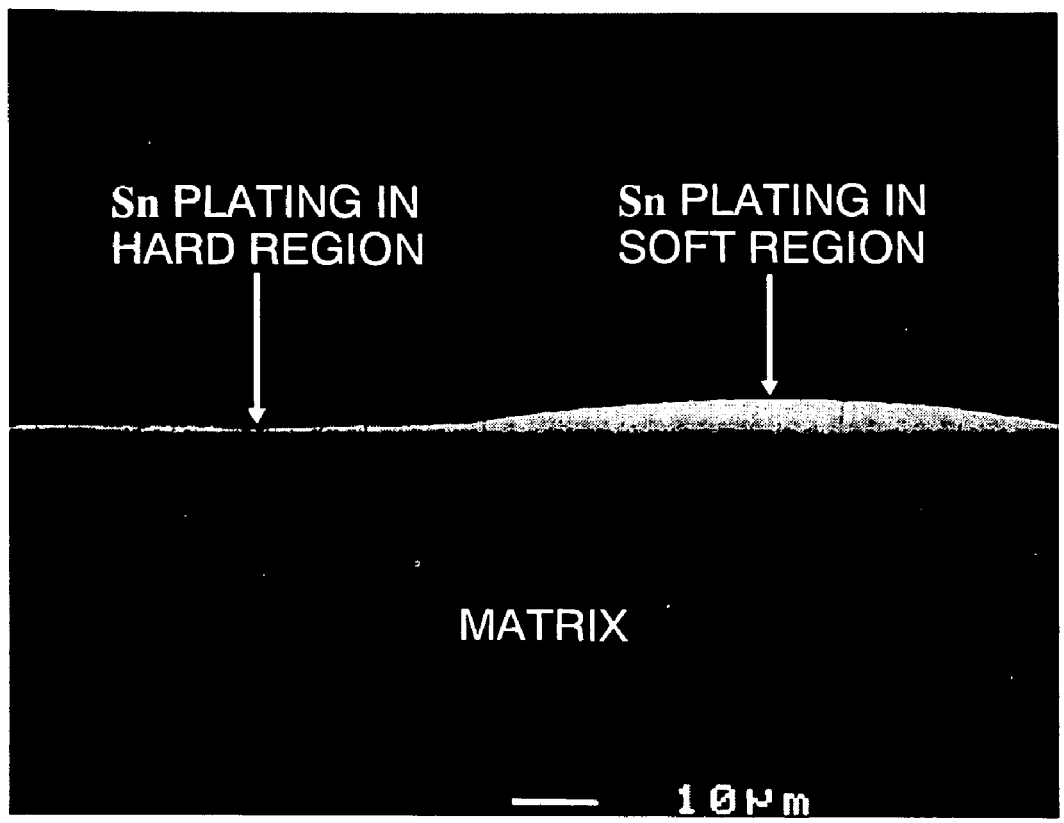
FIG. 14 is a cross-sectional SEM micrograph according to Example 1.

On the surface of the resulting female terminal, the Vickers hardness (10 gf) was measured at several points, thereby to determine the hardness of the soft region and the hardness of the hard region. With respect to the soft region and the hard region, the thickness of the Sn plating layer and the residual thickness of the Cu base layer were measured. In the measurement of the plating thickness, a fluorescent X-ray thickness tester, an electrolytic thickness tester, a cross-sectional SEM observation method, a cross-sectional EPMA observation method and a laser microscope were used in combination. The results are shown in Table 1. In Examples 1 to 7 and Comparative Example 2, the soft region and the hard region were formed, while they were not formed in Comparative Examples 1 and 3 to 8. FIG. 6 and FIG. 7 are micrographs of the surface of the plated material of Example 1. FIG. 8 and FIG. 9 are micrographs of the surface of the plated material of Example 2. FIG. 10 and FIG. 11 are micrographs of the surface of the plated material of Example 3. FIG. 12 and FIG. 13 are micrographs of the surface of the plated material of Comparative Example 1. FIG. 14 is a cross-sectional SEM micrograph of Example 1. The presence of the soft region with a thick Sn layer and the hard region with a thin Sn layer could be confirmed.

As the substrate of a male terminal, a copper alloy 1 shown in Table 2 was used. On the substrate made of the copper alloy, a 0.54 µm thick Cu base layer was formed by electroplating under the same conditions as described above, and then 0.98 µm thick Sn plating layer was formed thereon. This substrate was heated at 280° C. for 65 seconds, thereby to melt the Sn plating layer and to mutually diffuse Cu of the Cu base layer and the substrate surface, and Sn of the Sn plating layer, thus forming a Cu—Sn alloy layer at the interface between both layers. Since this male terminal was not subjected to a grain boundary oxide formation treatment or a segregation treatment, the soft region and the hard region were not formed and only a uniform diffusion layer was formed over the entire surface.

Using flat sheets before forming into terminals of Examples 1 to 7 in combination with flat sheets before forming into terminals of Comparative Examples 1 to 8, a slidability test was carried out by the method in accordance with ASTM-D1894. The results are shown in Table 3. A coefficient of static friction (µS=A/B) and a coefficient of dynamic friction (µK=C/B) were determined while controlling a moving speed upon sliding to 100 mm/min and controlling a movement to 30 mm. Provided that A denotes a load peak value which appears at the beginning of the measurement, B denotes a weight of a moving weight (1000 g in this case), and C denotes an average load value after turning into uniform running.

TABLE 3

| Female terminal and material for female terminal | Friction coefficient (moving weight: 1000 g) | | Insertion and withdrawal force | | | |
|---|---|---|---|---|---|---|
| | | | Initial | | Tenth time | |
| | Coefficient of static friction (μS) | Coefficient of dynamic friction (μK) | Insertion force (N) | Withdrawal force (N) | Insertion force (N) | Withdrawal force (N) |
| Example 1 | 0.321 | 0.360 | 1.82 | 2.05 | 1.75 | 1.96 |
| Example 2 | 0.243 | 0.313 | 2.00 | 2.21 | 1.87 | 2.18 |
| Example 3 | 0.265 | 0.375 | 1.95 | 2.10 | 1.93 | 2.88 |
| Example 4 | 0.285 | 0.319 | 2.28 | 2.37 | 2.15 | 2.28 |
| Example 5 | 0.323 | 0.380 | 2.34 | 3.21 | 2.85 | 3.32 |
| Example 6 | 0.312 | 0.342 | 2.07 | 2.04 | 1.85 | 2.32 |
| Example 7 | 0.275 | 0.346 | 2.05 | 2.11 | 1.95 | 2.22 |
| Comparative Example 1 | 0.391 | 0.418 | 3.95 | 3.93 | 3.64 | 3.87 |
| Comparative Example 2 | 0.375 | 0.395 | 3.73 | 3.83 | 3.24 | 3.85 |
| Comparative Example 3 | 0.301 | 0.324 | 2.12 | 2.03 | 2.03 | 1.97 |
| Comparative Example 4 | 0.336 | 0.385 | 3.75 | 3.80 | 3.54 | 3.82 |
| Comparative Example 5 | 0.365 | 0.412 | 3.88 | 3.90 | 3.56 | 3.75 |
| Comparative Example 6 | 0.401 | 0.445 | 4.13 | 3.97 | 3.95 | 3.76 |
| Comparative Example 7 | 0.387 | 0.423 | 4.21 | 3.75 | 4.10 | 3.53 |
| Comparative Example 8 | 0.328 | 0.397 | 3.66 | 3.62 | 3.48 | 3.63 |

Using the sheets described above, a male terminal and a female terminal were subjected to press working and actual insertion and withdrawal forces were measured. The male terminal has a thickness of 0.64 mm and a width of 1.0 mm, while the female terminal has a thickness of 0.25 mm, a width of 5.0 mm and a length of 30 mm. The shape is as shown in FIG. 1. In the evaluation of the insertion and withdrawal force, maximum values are determined when inserted and withdrawn at the initial stage (first time) and tenth time. The results are shown in Table 3. As is apparent from Table 3, in female terminals of Example 1 to 7, the friction coefficient and insertion and withdrawal force could be nearly reduced as compared with Comparative Examples 1, 2 and 4 to 8.

[Test 2]

Under the conditions shown in Table 4, male terminals of Examples 8 to 14 and Comparative Examples 9 to 16, and a female terminal (described in the bottom line of Table 4) were manufactured. As the substrates of Examples 8 to 14 and Comparative Examples 9 to 16, copper alloys F to J shown in Table 2 were used. As the substrate of the female terminal, a copper alloy D was used. Plating conditions, which are not specified, are the same as in Test 1. In Examples 8 to 14 and Comparative Example 10, the soft region and the hard region were formed, while they were not formed in Comparative Examples 9 and 11 to 16. Comparative Examples 9 and 12 to 14 are examples wherein an influence of the substrate surface was avoided to the utmost by subjecting to a comparatively thick Cu base plating. Comparative Examples 15 and 16 are examples which employ conventional reflow Sn plating (without subjecting to a grain boundary oxide formation treatment or a segregation treatment). Comparative Example 10 shows an example with less difference in plating thickness between the soft region and the hard region. Comparative Example 11 shows an example which is subjected to hard Sn plating (a ratio of an alloy layer is increased).

TABLE 4

| Male terminal | Plating characteristics | | | | | |
|---|---|---|---|---|---|---|
| | Sn plating thickness (μm) | | Base thickness (μm) | Pure Sn layer thickness (μm) | | Network length (μm) |
| | Hard region | Soft region | | Hard region | Soft region | |
| Example 8 | 0.25 | 5.03 | Cu: 0 | 0.09 | 2.03 | 50 |
| Example 9 | 0.46 | 4.21 | Cu: 0.12 | 0.18 | 1.72 | 65 |
| Example 10 | 0.53 | 2.53 | Cu: 0.27 | 0.33 | 1.21 | 105 |
| Example 11 | 0.21 | 5.52 | Cu: 0.11 | 0.05 | 2.87 | 90 |
| Example 12 | 0.75 | 1.23 | Cu: 0.28 | 0.40 | 0.74 | 380 |
| Example 13 | 0.35 | 2.46 | Cu: 0.25 | 0.13 | 0.98 | 120 |
| Example 14 | 0.78 | 1.23 | Ni: 0.11 | 0.49 | 0.87 | 400 |
| Comparative Example 9 | 0.92 | | Cu: 0.42 | 0.51 | | — |
| Comparative Example 10 | 0.77 | 0.91 | Cu: 0.38 | 0.31 | 0.60 | 650 |
| Comparative Example 11 | 1.21 | | Cu: 0.51 | 0.07 | | — |
| Comparative Example 12 | 1.11 | | Cu: 0.48 | 0.53 | | — |
| Comparative Example 13 | 0.95 | | Cu: 0.54 | 0.49 | | — |
| Comparative Example 14 | 2.13 | | Cu: 0.55 | 0.73 | | — |
| Comparative Example 15 | 0.78 | | Cu: 0.22 | 0.32 | | — |
| Comparative Example 16 | 1.22 | | Cu: 0.45 | 0.63 | | — |
| Female terminal used in combination | 0.87 | | Cu: 0.51 | 0.48 | | — |

TABLE 4-continued

| | Plating characteristics | | | | | |
|---|---|---|---|---|---|---|
| | Reflow conditions | | Surface hardness Hv (10 gf) | | | |
| Male terminal | Temperature (° C.) | Time (sec) | Hard region | Soft region | Copper alloy | Grain boundary oxide formation or segregation treatment |
| Example 8 | 300 | 70 | 152 | 35 | F | 300° C. × 3 hr |
| Example 9 | 300 | 70 | 120 | 40 | F | 300° C. × 3 hr |
| Example 10 | 300 | 70 | 118 | 65 | F | 300° C. × 3 hr |
| Example 11 | 300 | 65 | 165 | 38 | G | 300° C. × 3 hr |
| Example 12 | 300 | 55 | 102 | 65 | H | 300° C. × 3 hr |
| Example 13 | 320 | 75 | 140 | 73 | I | 300° C. × 3 hr |
| Example 14 | 320 | 80 | 115 | 68 | I | 300° C. × 3 hr |
| Comparative Example 9 | 300 | 70 | 70 | | F | 300° C. × 3 hr |
| Comparative Example 10 | 300 | 60 | 120 | 97 | F | 300° C. × 3 hr |
| Comparative Example 11 | 300 | 600 | 245 | | F | 300° C. × 3 hr |
| Comparative Example 12 | 300 | 70 | 70 | | H | 300° C. × 3 hr |
| Comparative Example 13 | 300 | 70 | 78 | | I | 300° C. × 3 hr |
| Comparative Example 14 | 320 | 75 | 65 | | J | 300° C. × 3 hr |
| Comparative Example 15 | 300 | 65 | 93 | | I | none |
| Comparative Example 16 | 300 | 65 | 75 | | J | none |
| Female terminal used in combination | 280 | 85 | 73 | | D | none |

Using the resulting male terminals of Examples 8 to 14 and Comparative Examples 9 to 16 in combination with the female terminal described above, a slidability test was carried out. The conditions of the slidability test are the same as in Test 1. The test results are shown in Table 5. As is apparent from Table 5, in female terminals of Example 8 to 14, the friction coefficient and insertion and withdrawal force could be nearly reduced as compared with Comparative Example 9, 10 and 12 to 16.

[Test 3]

With respect to Examples 1 to 7 and Comparative Examples 1 to 8, a solder wettability test was carried out. The results are shown in Table 6. The solder wettability test was carried out by the method in accordance with MIL-STD-883E and the results were evaluated by the meniscograph method. That is, a zero cross time and a maximum stress value were measured. The term "zero cross time" means the time required for the sample to be completely

TABLE 5

| | Friction coefficient (moving weight: 1000 g) | | Insertion and withdrawal force | | | |
|---|---|---|---|---|---|---|
| | Coefficient of | coefficient of | Initial | | Tenth time | |
| Male terminal and material for male terminal | static friction (μS) | dynamic friction (μK) | Insertion force (N) | Withdrawal force (N) | Insertion force (N) | Withdrawal force (N) |
| Example 8 | 0.232 | 0.275 | 1.44 | 1.82 | 1.42 | 1.60 |
| Example 9 | 0.236 | 0.280 | 1.48 | 1.81 | 1.46 | 1.63 |
| Example 10 | 0.216 | 0.310 | 1.60 | 2.11 | 1.78 | 2.01 |
| Example 11 | 0.241 | 0.291 | 1.41 | 1.95 | 1.42 | 1.83 |
| Example 12 | 0.295 | 0.385 | 2.01 | 2.24 | 2.01 | 2.12 |
| Example 13 | 0.198 | 0.322 | 1.84 | 1.95 | 1.35 | 1.52 |
| Example 14 | 0.255 | 0.325 | 1.74 | 1.85 | 1.54 | 1.83 |
| Comparative Example 9 | 0.337 | 0.429 | 3.25 | 3.41 | 3.12 | 3.43 |
| Comparative Example 10 | 0.305 | 0.409 | 2.53 | 2.85 | 2.34 | 3.39 |
| Comparative Example 11 | 0.217 | 0.225 | 1.42 | 1.68 | 1.43 | 1.45 |
| Comparative Example 12 | 0.341 | 0.412 | 3.65 | 3.68 | 3.43 | 3.45 |
| Comparative Example 13 | 0.303 | 0.395 | 3.01 | 3.11 | 2.89 | 3.01 |
| Comparative Example 14 | 0.356 | 0.436 | 3.76 | 3.85 | 3.55 | 3.65 |
| Comparative Example 15 | 0.318 | 0.398 | 2.75 | 2.95 | 2.64 | 2.88 |
| Comparative Example 16 | 0.352 | 0.401 | 3.43 | 3.55 | 3.29 | 3.43 | wetted with solder (the time required for the buoyancy of the same to become 0). The maximum stress value means a maximum stress value indicated in the measurement (10 seconds) when the sample is pull up after being wetted with solder. The test conditions are as follows.

Solder composition: Sn:Pb=63:37

Solder bath temperature: 230° C.±3° C.

Flux: "SOLDERITEY-20" (trade mark) (containing 5 to 10% by mass of toluene and 30 to 40% by mass of methanol, manufactured by TAMURA Corporation)

TABLE 6

| | Solder wettability Meniscograph | |
|---|---|---|
| | Zero cross time (sec) | Maximum stress value (mN) |
| Example 1 | 0.68 | 5.89 |
| Example 2 | 0.63 | 5.90 |
| Example 3 | 0.32 | 6.09 |
| Example 4 | 1.01 | 4.97 |
| Example 5 | 0.39 | 6.13 |
| Example 6 | 0.57 | 6.25 |
| Example 7 | 0.45 | 6.01 |
| Comparative Example 1 | 0.33 | 6.03 |
| Comparative Example 2 | 0.33 | 5.76 |
| Comparative Example 3 | 9.78 | 0.22 |
| Comparative Example 4 | 0.43 | 6.86 |
| Comparative Example 5 | 0.32 | 6.55 |
| Comparative Example 6 | 0.45 | 6.94 |
| Comparative Example 7 | 0.41 | 6.53 |
| Comparative Example 8 | 0.43 | 6.32 |

As shown in Table 6, with respect to solder wettability, male terminals of Examples 1 to 7 withstand comparison with male terminals of Comparative Examples 1, 2 and 4 to 6. In Comparative Example 3, the surface was hardened because Sn—Cu alloying was promoted under severe reflow conditions and good results were obtained in the insertion and withdrawal force test, while solder wettability was poor.

[Test 4]

With respect to Examples 1 to 7 and Comparative Examples 1 to 8, 15 and 16, a heat-resistant reliability test was carried out. In Table 7, the contact resistance value and the presence or absence of peeling are shown as the evaluation results of the heat-resistant reliability. The contact resistance value was determined by the method in accordance with JISC5402. Specifically, when flat sheets of Examples 1 to 7 and Comparative Examples 1 to 8, 15 and 16 are contacted with a gold contacter ("CRS-113" (trade mark), manufactured by YAMAZAKI SEIKI CO., LTD.) under a load of 50 gf, the contact resistance value was measured at an initial stage, after heating at 120° C. for 500 hours, heating at 150° C. for 500 hours, and heating at 190° C. for 500 hours, respectively. The sample was exposed in atmospheric air during heating.

The heat-resistant peelability was evaluated in the following manner. Each sample (10 mm in width×30 mm in length) was heated at 190° C. for 500 or 1000 hours in the state of being exposed in atmospheric air after 180° bending. After returning the bent sample to the original shape, the surface of the returned bent portion was observed by a magnifier (magnification: ×10) and the presence or absence of peeling was confirmed.

TABLE 7

| | Heat-resistant reliability | | | | | |
|---|---|---|---|---|---|---|
| | Contact resistance value (mΩ) | | | | Presence or absence of peeling | |
| | Initial | 120° C. × 500 hours | 150° C. × 500 hours | 190° C. × 500 hours | 190° C. × 500 hours | 190° C. × 1000 hours |
| Example 1 | 0.625 | 0.965 | 1.725 | 3.012 | none | none |
| Example 2 | 0.703 | 1.152 | 1.023 | 2.727 | none | none |
| Example 3 | 0.632 | 1.222 | 2.034 | 2.643 | none | none |
| Example 4 | 0.616 | 1.207 | 1.982 | 2.332 | none | none |
| Example 5 | 0.759 | 1.025 | 2.546 | — | none | none |
| Example 6 | 0.589 | 0.824 | 0.981 | 2.657 | none | none |
| Example 7 | 0.617 | 0.884 | 1.082 | 2.252 | none | none |
| Comparative Example 1 | 0.690 | 0.780 | 0.960 | 6.122 | observed | observed |
| Comparative Example 2 | 0.680 | 0.883 | 0.979 | 7.843 | observed | observed |
| Comparative Example 3 | 1.242 | 1.285 | 1.972 | 6.718 | observed | observed |
| Comparative Example 4 | 0.635 | 0.924 | 1.212 | 7.021 | observed | observed |
| Comparative Example 5 | 0.663 | 0.756 | 0.923 | 6.232 | observed | observed |
| Comparative Example 6 | 0.752 | 1.023 | 1.113 | 5.854 | observed | observed |
| Comparative Example 7 | 0.628 | 1.021 | 1.352 | 2.642 | none | observed |
| Comparative Example 8 | 0.691 | 0.948 | 1.768 | 2.329 | none | observed |
| Comparative Example 15 | 0.562 | 0.847 | 1.854 | 5.291 | observed | observed |
| Comparative Example 16 | 0.631 | 1.029 | 1.035 | 2.743 | none | observed |

As shown in Table 7, in Examples 1 to 7, peeling did not occur even after exposure to air at 190° C. for 1000 hours and the contact resistance value was lower than 3.1 mΩ, and thus high reliability was seen. In Example 5, the evaluation at 190° C. was not carried out because the resulting terminal is not suited for use at high temperature due to high Zn concentration. In Comparative Example 1 to 6, since the substrate was subjected to a grain boundary oxide formation treatment or a segregation treatment and was also subjected to a Cu base treatment with a somewhat large thickness, peeling occurred after exposure to air at 190° C. for 500 hours. In Comparative Example 7, 8, 15 and 16, a conventional reflow Sn plating was carried out without subjecting the substrate surface to a grain boundary oxide formation treatment or a segregation treatment, and peeling occurred after exposure to air at 190° C. for 1000 hours because of poor reliability at high temperature.

Since the plated material, the terminal member for connector and the connector of the present invention have surface quality wherein the hard region coexists in the soft region spreading in a fine network-shape, and also each hardness is set within the above range, slidability can be enhanced by the soft region and excess wear of the surface of the metal plating layer can be prevented by the hard region. Since a contact pressure with an opposite material can be locally enhanced by making the surface hardness non-uniform, electric conduction can be certainly ensured and electrical resistance can be reduced.

The entire content of Priority Document No. 2003-136084 is incorporated herein by reference.

What is claimed is:

1. A plated material comprising a metal substrate, a metal plating layer formed on the surface of the substrate, and a soft region spreading in a network-shape and a hard region surrounded by the network of the soft region coexisting in the metal plating layer, wherein the soft region has a Vickers hardness of 20 to 250, the hard region has a Vickers hardness of 60 to 700, which is at least 30 higher than that of the soft region, and an average size of the network of the soft region is from 5 to 500 μm, and
    wherein the surface of the soft region is located at the position which is 0.2 to 10 μm higher than the surface of the hard region.

2. The plated material according to claim 1, wherein the metal plating layer is formed of an upper plating layer of Sn or a Sn alloy.

3. A terminal member for connector, at least a portion of which is formed of the plated material of claim 1.

4. A connector comprising a terminal member, at least a portion of which is formed of the plated material of claim 1.

5. A plated material comprising a metal substrate, a metal plating layer formed on the surface of the substrate, and the metal plating layer has a soft region spreading in a network-shape and a hard region surrounded by the network of the soft region coexisting in the metal plating layer, wherein the substrate is formed of a copper alloy consisting essentially by mass percent of 0.3 to 2% Mg, 0.001 to 0.02% P, 0.0001 to 0.0013% C, 0.0002 to 0.002% O, and the balance of Cu and inevitable impurities.

6. A plated material comprising a metal substrate, a metal plating layer formed on the surface of the substrate, and the metal plating layer has a soft region spreading in a network-shape and a hard region surrounded by the network of the soft region coexisting in the metal plating layer, wherein the substrate is formed of a copper alloy consisting essentially by mass percent of 0.5 to 3% Ni, 0.1 to 0.9% Sn, 0.08 to 0.8% Si, 0.1 to 3% Zn, 0.007 to 0.25% Fe, 0.001 to 0.2% P, 0.001 to 0.2% Mg, 0.0001 to 0.005% C, and the balance of Cu and inevitable impurities.

7. A method of manufacturing a plated material, comprising the steps of:
    making the deposition condition of plating material on the surface of the metal substrate non-uniform;
    subjecting the surface of the substrate to metal plating to form a metal plating layer; and
    subjecting the substrate, on which the metal plating layer was formed, to a reflow treatment by heating to the temperature higher than a melting point of the metal plating;
    wherein the reflow treatment enables a soft region spreading in a network-shape and a hard region surrounded by the network of the soft region to coexist in the metal plating layer, while controlling so that the soft region has a Vickers hardness of 20 to 250, the hard region has a Vickers hardness of 60 to 700, which is at least 30 higher than that of the soft region, and an average size of the network of the soft region is from 5 to 500 μm.

8. The method of manufacturing a plated material according to claim 7, wherein an alloying element is segregated at the grain boundary of the substrate in the step of making the deposition condition of plating material non-uniform.

9. The method of manufacturing a plated material according to claim 7, wherein an oxide is formed at the grain boundary of the substrate in the step of making the deposition condition of plating material non-uniform.

10. The method of manufacturing a plated material according to claim 7, wherein the surface of the substrate is provided with unevenness by etching the surface of the substrate in the step of making the deposition condition of plating material non-uniform.

11. The method of manufacturing a plated material according to claim 7, wherein the surface of the substrate is provided with unevenness by subjecting the surface of the substrate to roll working using a roll with unevenness in the step of making the deposition condition of plating material non-uniform.

* * * * *